(12) United States Patent
Brown et al.

(10) Patent No.: US 9,747,047 B2
(45) Date of Patent: Aug. 29, 2017

(54) PERFORMING A REMOTE POINT-IN-TIME COPY TO A SOURCE AND TARGET STORAGES IN FURTHER MIRROR COPY RELATIONSHIPS

(71) Applicant: INTERNATIONAL BUSINESS MACHINES CORPORATION, Armonk, NY (US)

(72) Inventors: Theresa M. Brown, Tucson, AZ (US); Susan K. Candelaria, Tucson, AZ (US); Nedlaya Y. Francisco, Tucson, AZ (US); Lisa J. Gundy, Tucson, AZ (US); Corey G. Smeaton, Somerville, MA (US); Warren K. Stanley, Loveland, CO (US); Jeffrey R. Suarez, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 133 days.

(21) Appl. No.: 14/314,036

(22) Filed: Jun. 25, 2014

(65) Prior Publication Data
US 2015/0378832 A1    Dec. 31, 2015

(51) Int. Cl.
*G06F 11/00* (2006.01)
*G06F 3/06* (2006.01)
(Continued)

(52) U.S. Cl.
CPC .............. *G06F 3/0619* (2013.01); *G06F 3/06* (2013.01); *G06F 3/065* (2013.01); *G06F 3/067* (2013.01);
(Continued)

(58) Field of Classification Search
CPC .................................................... G06F 11/1451
See application file for complete search history.

(56) References Cited

U.S. PATENT DOCUMENTS

| 6,378,084 B1 | 4/2002 | Strunk et al. |
| 6,408,343 B1 | 6/2002 | Erickson et al. |

(Continued)

OTHER PUBLICATIONS

W. Bauer, et al., "IBM z/OS Metro/Global Mirror Incremental Resync", IBM Corp. Redpaper, 2009, pp. 28.

(Continued)

*Primary Examiner* — Christopher McCarthy
(74) *Attorney, Agent, or Firm* — David W. Victor; Konrad Raynes Davda & Victor LLP.

(57) ABSTRACT

Provided are a computer program product, system, and method for performing a remote point-in-time copy to a source and target storages in further mirror copy relationships. Each of a plurality of source copy relationships is from the source storage to one corresponding source copy storage. Each of a plurality of target copy relationships is from the target storage to one corresponding target copy storage, where in each relationship an indicator indicates whether to use a remote first type copy operation. The first type copy operation is used to copy data from the source storage to the target storage and copy data from the source copy storage to the target copy storage for the determined source and target copy relationships having the indicator set. A second type of copy operations is used for source and target relationships not having the indicator set.

23 Claims, 5 Drawing Sheets (51) Int. Cl.
*G06F 11/14* (2006.01)
*G06F 11/20* (2006.01)

(52) U.S. Cl.
CPC ...... *G06F 11/1451* (2013.01); *G06F 11/2058* (2013.01); *G06F 11/2071* (2013.01); *G06F 2201/84* (2013.01)

(56) References Cited

U.S. PATENT DOCUMENTS

| | | | |
|---|---|---|---|
| 7,676,641 B2* | 3/2010 | Agombar | G06F 11/2058 711/161 |
| 9,135,121 B2* | 9/2015 | Brown | G06F 11/1451 |
| 9,158,471 B2* | 10/2015 | Benhase | G06F 3/0619 |
| 2004/0260899 A1 | 12/2004 | Kern et al. | |
| 2006/0179218 A1 | 8/2006 | Burkey | |
| 2012/0079224 A1* | 3/2012 | Clayton | G06F 11/1456 711/162 |
| 2013/0042083 A1* | 2/2013 | Mutalik | G06F 17/30162 711/162 |
| 2015/0161194 A1* | 6/2015 | Provenzano | G06F 17/30386 707/690 |
| 2015/0363282 A1* | 12/2015 | Rangasamy | G06F 11/2033 714/4.12 |

OTHER PUBLICATIONS

B. Dufrasne, et al., "IBM System Storage DS8000: Remote Pair FlashCopy (Preserve Mirror)", IBM Corp., Redpaper, May 2009, pp. 56.

* cited by examiner

FIG. 1

Copy Relationship

FIG. 2

Remote Pair PiT Copy Establish Request

PERFORMING A REMOTE POINT-IN-TIME COPY TO A SOURCE AND TARGET STORAGES IN FURTHER MIRROR COPY RELATIONSHIPS

BACKGROUND OF THE INVENTION

1. Field of the Invention

The present invention relates to a computer program product, system, and method for performing a remote point-in-time copy to a source and target storages in further mirror copy relationships.

2. Description of the Related Art

In a storage environment, a storage controller may create point-in-time ("PiT") copies of a production volume using point-in-time copy techniques, such as the IBM Flash-Copy® (FlashCopy is a registered trademark of IBM), snapshot, etc. A point-in-time copy replicates data in a manner that appears instantaneous and allows a host to continue accessing the source and target volumes while actual data transfers to the target volume are deferred to a later time. The point-in-time copy appears instantaneous because complete is returned to the copy operation in response to generating the relationship data structures without copying the data from the source to the target volumes. Point-in-time copy techniques typically defer the transfer of the data in the source volume at the time the point-in-time copy relationship was established to the copy target volume until a write operation is requested to that data block on the source volume. Data transfers may also proceed as a background copy process with minimal impact on system performance. The point-in-time copy relationships that are immediately established in response to the point-in-time copy command include a bitmap or other data structure indicating the location of blocks in the volume at either the source volume or the target volume. The point-in-time copy comprises the combination of the data in the source volume and the data to be overwritten by the updates transferred to the target volume.

In a mirror copy relationship, a primary storage comprises the storage or volumes from which data is physically copied to a secondary storage or volume. To address a situation where a mirror primary volume on a local site becomes the target of a PiT copy or FlashCopy operation from a source volume on the local site, which source volume may also be a primary volume in a mirror copy, IBM developed the Remote Pair FlashCopy operation so that when data is FlashCopied, i.e., PiT copied, from a source volume to a target volume on a local site when the source and target volumes are also primary volumes in mirror copy relationships to secondary volumes at a remote site, an equivalent FlashCopy operation is performed on the remote site to FlashCopy the remote secondary volumes in the mirror relationship so that the mirror copy to the secondary volumes can be accomplished instantly with a PiT copy.

This Remote Pair FlashCopy operation ensures that the mirror copy relationship is not interrupted due to the primary storage in the mirror relationship becoming the target of a FlashCopy relationship. With Remote Pair FlashCopy, when the FlashCopy source and target devices are both mirror primary devices in full duplex state, the FlashCopy is performed locally between the source and target, i.e., the primary volumes in the mirror relationship, and then the FlashCopy is sent inband to the FlashCopy server having the secondary volumes of the mirror and performed remotely between the two secondary volumes.

By ensuring that the mirror relationships are not interrupted by the FlashCopy operation, the mirror storages remain available for a failover operation from the mirror secondary storage to the mirror primary storage, such as the IBM HyperSwap®, which provides continuous availability for disk failures by maintaining synchronous copies of all primary disk volumes on one or more primary storage systems to one or more target (or secondary) storage systems. (HyperSwap is a registered trademark of IBM in countries throughout the world).

SUMMARY

Provided are a computer program product, system, and method for performing a remote point-in-time copy to a source and target storages in further mirror copy relationships. A plurality of source copy relationships are established, wherein each of the source copy relationships is from the source storage to one corresponding source copy storage, wherein data is copied from the source storage to the source copy storages in the copy relationships to provide a mirror copy of data at the source storage at the source copy storages. A plurality of target copy relationships are established, wherein each of the target copy relationships is from the target storage to one corresponding target copy storage, wherein data is copied from the target storage to the source copy storages to provide a mirror copy at the source copy storages. For each of the source and target copy relationships, an indicator indicates whether to use a remote first type copy operation. A determination is made from the indicator the source and target copy relationships indicating to use the remote first type of copy operation. The first type copy operation is used to copy data from the source storage to the target storage. The first type of copy operations to copy data from the source copy storage to the target copy storage for the determined source and target copy relationships having the indicator set to use the remote first type copy operation in response to using the first type copy operation to copy data from the source storage to the target storage. A second type of copy operations is used to copy data from the source storage to the source copy storage and from the target storage to the target copy storage in the source and target relationships having the indicator set to not use the remote first type of copy operation.

DETAILED DESCRIPTION

Described embodiments provide techniques for performing a remote PiT copy operation in environments when the source and target storages of the remote PiT copy operation each comprise primary volumes in multiple mirror copy relationships having secondary volumes in a remote storage. With described embodiments, the copy relationship includes an indicator indicating whether that copy relationship may be subject to a remote PiT copy operation where the PiT copy operation is performed at a remote site including the secondary storages of primary volumes that are source and target storages in a PiT copy relationship, so the mirror copy to the secondary volumes whose primary volumes are source and target storages subject to the PiT copy can be performed by performing a PiT copy of the secondary storages in the mirror relationship at the remote site. The indicator may be used to determine whether there is ambiguity as to which copy relationships to use for the remote PiT copy operation and how to handle any determined ambiguity.

Figure 1:
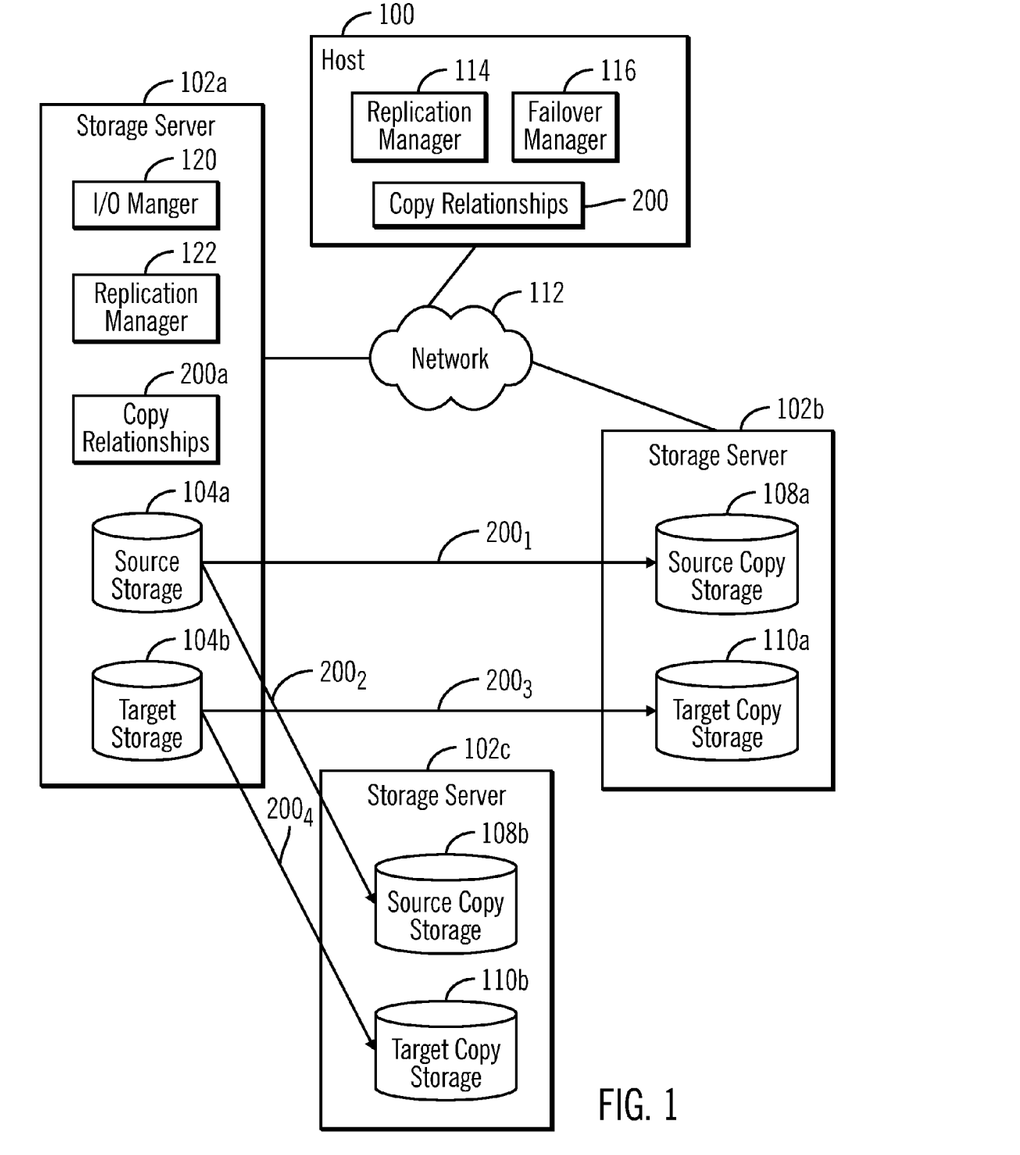
FIG. 1 illustrates an embodiment of a storage replication environment.

FIG. 1 illustrates an embodiment of a replication copy storage environment having a host system 100 that is connected to a plurality of storage servers 102a, 102b, 102c. Storage server 102a manages a source storage 104a having one or more volumes and a target storage 104b having one or more volumes, where the data in the source storage 104a may be copied to the target storage 104b. The source storage 104a may be in separate mirror copy relationships $200_1$ and $200_2$ with source copy storages 108a and 108b which are located in different storage servers 102b and 102c, respectively. Likewise, the target storage 104b may be in copy relationships $200_3$ and $200_4$ with target copy storages 110a and 110b which are located in the different storage servers 102b and 102c, respectively. In an alternative embodiment, the secondary copy storages 108a, 108b, 110a, 110b may all be in one storage server. The host 100 and storage servers 102a, 102b, 102c may communicate over a network 112. There may be additional hosts (not shown) that provide Input/Output (I/O) requests to the source 104a and target 104b storages. The data in the source storage 104a may be copied to the target storage 104b in the manner described below.

The host system 100 includes a replication manager 114 to establish mirror copy relationships 200 between the different storages as shown by the copy relationships $200_1$, $200_2$, $200_3$, and $200_4$. In each of the copy relationships, data is synchronized or copied from a primary storage to a secondary storage, as shown by the direction of the arrows in the illustrated copy relationships $200_1$, $200_2$, $200_3$, and $200_4$. The host 100 further includes a failover manager 116 to use to implement a failover from a primary storage to a secondary storage in a copy relationship 200.

Each of the storage servers 102a, 102b, 102c may include, as shown with respect to storage server 102a, an I/O manager 120 to manage I/O requests and a replication manager 122 to manage copy relationships 200a, such as copying data written to the source 104a, and target 104b storages to any source 108a, 108b and target 110a, 110b copy storages to synchronize data therebetween.

In the embodiment of FIG. 1 there are three storage servers 102a, 102b, 102c and two mirror copy relationships for each of the source 104a and target 104b storages. However, in different implementations there may be at least two secondary storage systems and more than three secondary storage systems. Further, there may be more copy relationships from the source 104a and target 104b storages than shown by way of example.

The storage servers 102a, 102b, 102c may comprise an enterprise storage controller/server suitable for managing access to attached storage devices, such as, but not limited to, the International Business Machine Corporation's ("IBM") DS8000® storage system or other vendor storage servers known in the art. (DS8000 is a registered trademark of IBM in countries throughout the world).

In one embodiment, the replication manager 114, 122 comprises a program for managing the mirroring of volumes across systems, such as, but not limited to, the IBM mirroring programs Geographically Dispersed Parallel Sysplex® (GDPS)®, and Tivoli® Storage Productivity Center for Replication (TPC-R) that define a replication session and copy pairs 200. Different types of techniques may be selected to copy the data, such as synchronous mirroring, asynchronous mirroring or point-in-time copying, or combinations of multiple of these different mirroring types. The failover manager 116 may comprise a program suitable for handling the failover of one of the source copy storages 108a, 108b to the source storage 104a and a failover from one of the target copy storages 110a, 110b to the target storage 104b, such as, but not limited to, the IBM Hyper-Swap product which establishes failover sessions from the established copy pairs. (Geographically Dispersed Parallel Sysplex, GDPS, Tivoli, and HyperSwap are registered trademarks of IBM in countries throughout the world).

In alternative embodiments, the functionality described with respect to the replication manager 116 and failover manager 126 may be implemented in a single storage manager program or in multiple different program modules.

In one embodiment a first type of copy operation comprises the PiT copy operation and a second type of copy operation comprises a mirror copy operation. In additional embodiments, the first and second copy operation subject to the operations may comprise other copy operations known in the art.

The network 112 may comprise a Storage Area Network (SAN), Local Area Network (LAN), Intranet, the Internet, Wide Area Network (WAN), peer-to-peer network, wireless network, arbitrated loop network, etc. The storages 104a, 104b, 108a, 108b, 110a, 110b may each be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. Then storage devices in which the storages 104a, 104b, 108a, 108b, 110a, 110b are implemented may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

Figure 2:
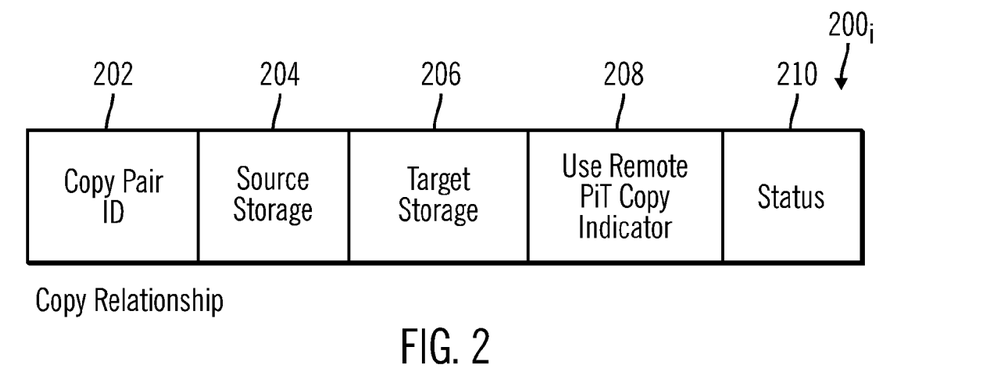
FIG. 2 illustrates an embodiment of a copy relationship.

FIG. 2 illustrates an embodiment of an instance of a copy relationship $200_i$, e.g., copy relationships $200_1$, $200_2$, $200_3$, and $200_4$, which may be included in the copy relationships 200 and 200a, as including a copy pair identifier (ID) 202; a primary storage 204 from which data is copied; a secondary storage 206 to which data is mirrored; a use remote point-in-time ("PiT") copy indicator 208 indicating whether a remote PiT copy operation will be performed for the relationship or whether data is to be directly copied from the primary 204 to the secondary 206 storages if remote PiT copy is not used; and a status 210 of the copy relationship, such as pending (indicating that data is in the process of being copied from the primary 204 to the secondary 206 storage, and during a pending status, data is not synchronized), duplex (indicating that the pair is synchronized and all writes to the primary have been applied to the secondary), simplex (the relationship has not been established), suspended (when the primary 204 cannot be successfully synchronized to the secondary 206).

Figure 3:
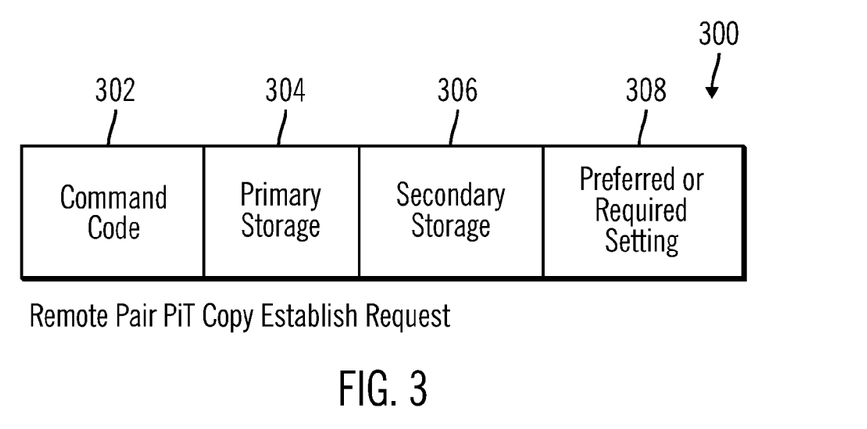
FIG. 3 illustrates an embodiment of a remote pair point-in-time ("PiT") copy establish request.

FIG. 3 illustrates an embodiment of a remote pair PiT copy establish request 300 that the host 100 would issue to the storage server 102a having the source 104a and target 104b storages for which a remote PiT copy operation can be performed. The request 300 includes a command code 302 identifying the remote pair PiT copy establish request; a source storage 304 that is the source of the PiT copy; a target secondary storage 306 that is the target of the PiT copy; and a preferred or required setting 308. The required setting indicates that the request 300 will fail if a remote PiT copy operation cannot be used for one of the pairs, or copy relationships, to allow a remote PiT copy from one source copy storage 108a, 108b to one target copy storage 110a, 110b. The required setting indicates the request 300 cannot tolerate the pairs all being in a duplex pending state where data is physically copied from the target storage 104b to all of the target copy storages 110a, 110b. A preferred setting indicates that the request 300 can tolerate all pairs going into a duplex pending state if the remote PiT copy cannot be performed, requiring that a mirror copy operation is performed to copy the target storage 104b to the target copy storages 110a, 110b.

Figure 4:
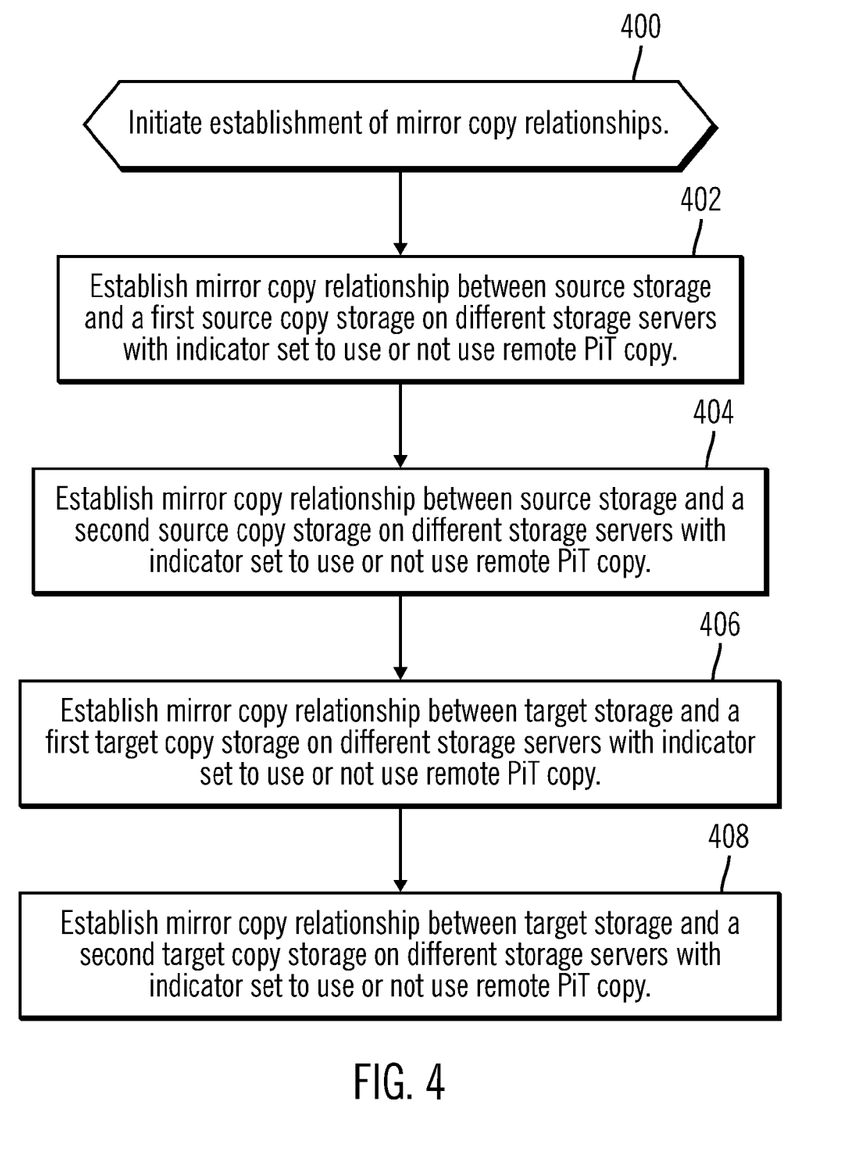
FIG. 4 illustrates an embodiment of operations to establish mirror copy relationships.

FIG. 4 illustrates an embodiment of operations performed by the replication manager 114 at the host 100 to establish the underlying copy relationships $200_1$, $200_2$, $200_3$, and $200_4$ before processing the remote pair PiT copy establish request 300. These operations of FIG. 4 may each be initiated in response to user entered establish commands via a user interface of the replication manager 114 or automatically executed as part of a script program including the mirror copy relationship establish commands. Upon initiating (at block 400) the operations to establish mirror copy relationships $200_1$, $200_2$, $200_3$, and $200_4$, the replication manager 114 establishes (at block 402) a mirror copy relationship $200_1$ between the source storage 104a and a first source copy storage 108a on different storage servers 102a, 102b where the indicator 208 may be set to use or not use remote PiT copy. At block 404, the replication manager 114 establishes a mirror copy relationship $200_2$ between the source storage 104a and the second source copy storage 108b on different storage servers 102a, 102c where the indicator 208 may be set to use or not use remote PiT copy. At block 406, the replication manager 114 establishes a mirror copy relationship $200_3$ between the target storage 104b and a first target copy storage 110a on different storage servers 102a, 102b where the indicator 208 may be set to use or not use remote PiT copy. At block 408, the replication manager 114 establishes a mirror copy relationship $200_4$ between the target storage 104b and a second target copy storage 110b on different storage servers 102a, 102c where the indicator 208 may be set to use or not use remote PiT copy.

Once the mirror copy relationships $200_1$, $200_2$, $200_3$, and $200_4$ are established, data is copied from the primary storage, e.g., source 104a, target 104b storages, to a secondary storage, e.g., copy storages 108a, 108b, 110a, 110b, to synchronize the data therebetween. In one implementation, the user may set the indicator 208 so only one each of the source and target copy relationship pairs, e.g., $200_1$, $200_3$, use the remote PiT copy and other of the source and target copy relationships e.g., $200_2$, $200_4$, have the indicator 208 set to not use the remote PiT copy, i.e., the relationship is placed in a duplex pending state until data is physically copied over. However, the user may also indicate other settings for the indicator 208 in the copy relationships.

In certain implementations, the replication manager 114 to may only be able to implement the remote pair PiT copy establish command 300 if there is no ambiguity as to which of the multiple secondary storages 108a, 108b, 110a, 110b in the copy relationships, e.g., $200_1$, $200_2$, $200_3$, $200_4$, will use a remote PiT copy operation and which ones will not. This means in certain implementations, the remote PiT copy operation cannot be performed if multiple of the source and target relationships each specify to use the remote PiT copy because in such case there is ambiguity as to which copy relationship should be used for the remote PiT copy operation. Further, there may also be ambiguity if there are multiple relationships but none specify to use the remote PiT in the indicator 208. Yet further, if there is only one relationship, then there is no ambiguity regardless of the setting of use remote PiT indicator 208.

Figure 5:
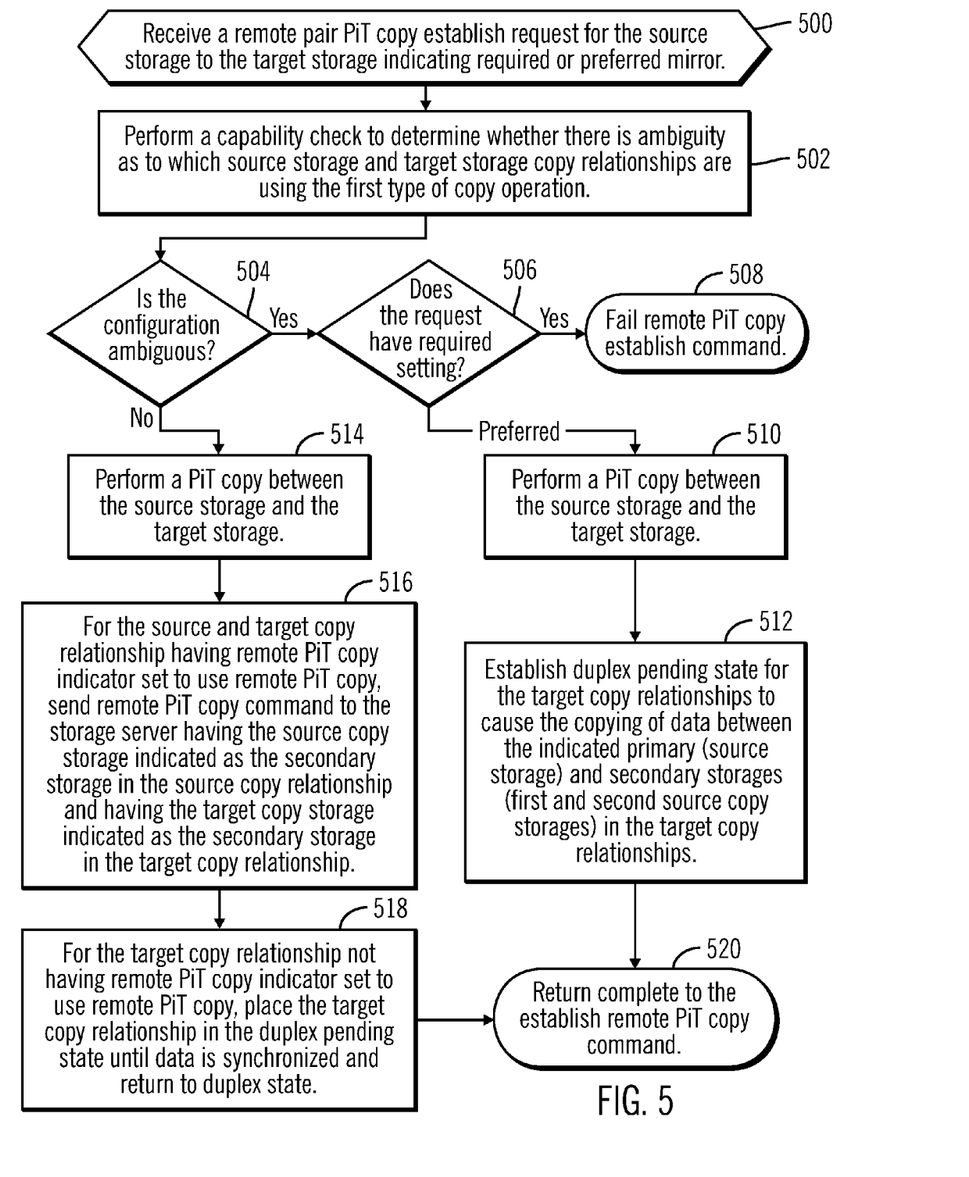
FIG. 5 illustrates an embodiment of operations to process a remote pair PiT copy establish request.

FIG. 5 illustrates an embodiment of operations performed by the replication managers 114, 120 to process a remote pair PiT copy establish command 300 to address the situation when there is ambiguity as to which copy relationship should be used for the remote PiT copy operation. The replication manager 122 at the storage server 102a receives (at block 500) from the replication manager 114 in the host 100 a remote pair PiT copy establish command 300 for the source storage 104a to the target storage 104b indicating required or preferred mirror 308. This command 300 may be received after full duplex state established between all the relationships $200_1$, $200_2$, $200_3$, $200_4$. The replication manager 200 performs (at block 502) a capability check to determine whether there is ambiguity as to which source storage and target storage copy relationships $200_1$, $200_2$, $200_3$, $200_4$ indicate to use the remote first PiT copy operation. In one embodiment, ambiguity is determined if zero or more than one of the indicators 208 for each of the source and target copy relationships indicates to use the first type copy operation. For instance, there is ambiguity if no source copy relationship and/or no target copy relationship has the indicator 208 set to indicate to use the remote PiT copy or if more than two of the source copy relationships and/or more than two of the target copy relationships have the indicator 208 set to indicate to use the remote PiT copy. In such implementations, there is no ambiguity if one source copy relationship and one target copy relationship have the indicator 308 set to indicate to use the remote PiT copy, because the secondary volumes of the mirror copy relationships to subject to the remote PiT copy command are definite.

If (at block 504) the configuration is ambiguous and if (at block 506) the request 300 has the required setting 308, then the remote pair PiT copy establish request 300 is failed (at block 508). Otherwise, if the setting 308 is the preferred setting, then the replication manager 122 performs (at block 510) a PiT copy between the source storage 104a to the target storage 104b at the storage server 102a. The replication manager 122 further establishes (at block 512) duplex pending state for the target copy relationships $200_2$, $200_3$ to cause the physical copying of data between the indicated primary (source storage) and secondary storages (first and second source copy storages) in the target copy relationships on the different storage servers 102a, 102b, 102c. When this occurs, the target storage subject to the pending state cannot be available for a failover operation until the copying completes and the state is duplex.

If (at block 504) the configuration is not ambiguous, i.e., it is clear which source and target copy relationship to use for the remote PiT copy, then the replication manager 122 performs (at block 514) a PiT copy between the source storage 104a to the target storage 104b at the storage server 102a. For the source and target copy relationship having the use remote PiT copy indicator 308 set to use remote PiT copy, the replication manager 122 sends (at block 516) the remote PiT copy command to the storage server 102b having the source copy storage 108a, 108b indicated as the secondary storage 206 in the source copy relationship $200_1$ or $200_2$ and having the target copy storage 110a, 110n indicated as the secondary storage 208 in the target copy relationship $200_3$ or $200_4$. This remote PiT copy command causes the storage server 102a receiving the command to perform a PiT copy from the source copy storage to the target copy storage, which are the secondary storages of copy relationships whose primaries are subject to the PiT copy. For the target copy relationship not having the use remote PiT copy indicator 208 set to use remote PiT copy, the replication manager 122 places (at block 518) that target copy relationship, e.g., $200_3$ or $200_4$, in the duplex pending state until data is synchronized and can be returned to the duplex state. From blocks 512 and 516, complete is returned (at block 520) to the remote pair PIT copy establish request 300. For the source copy relationship not having the use remote PiT copy indicator 208 set to use remote PiT copy, writes to the primary storage 204 (source storage 104a) would be automatically synchronized to the secondary storage 206 (source copy storages 108a, 108b).

In the described embodiments, the capability check is performed by the replication manager 122 in the storage server 120a receiving the request 300. In an alternative embodiment, capability check and other of the operations of FIG. 5 may be performed by the replication manager 114 in the host initiating the request 300.

The described embodiments provide techniques to process a remote pair PiT copy request in environments having multiple targets, or mirror copy secondary storages, to the source and target storages that are subject to the remote pair PiT copy requests. Described embodiments include an indicator with the copy relationship indicating whether a remote PiT copy command can be used with the secondary storage in the mirror copy relationship so that a PiT copy operation can be performed from a storage in the same remote storage server that is also the secondary storage of mirror copy relationship having as a primary storage the source of the PiT request.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
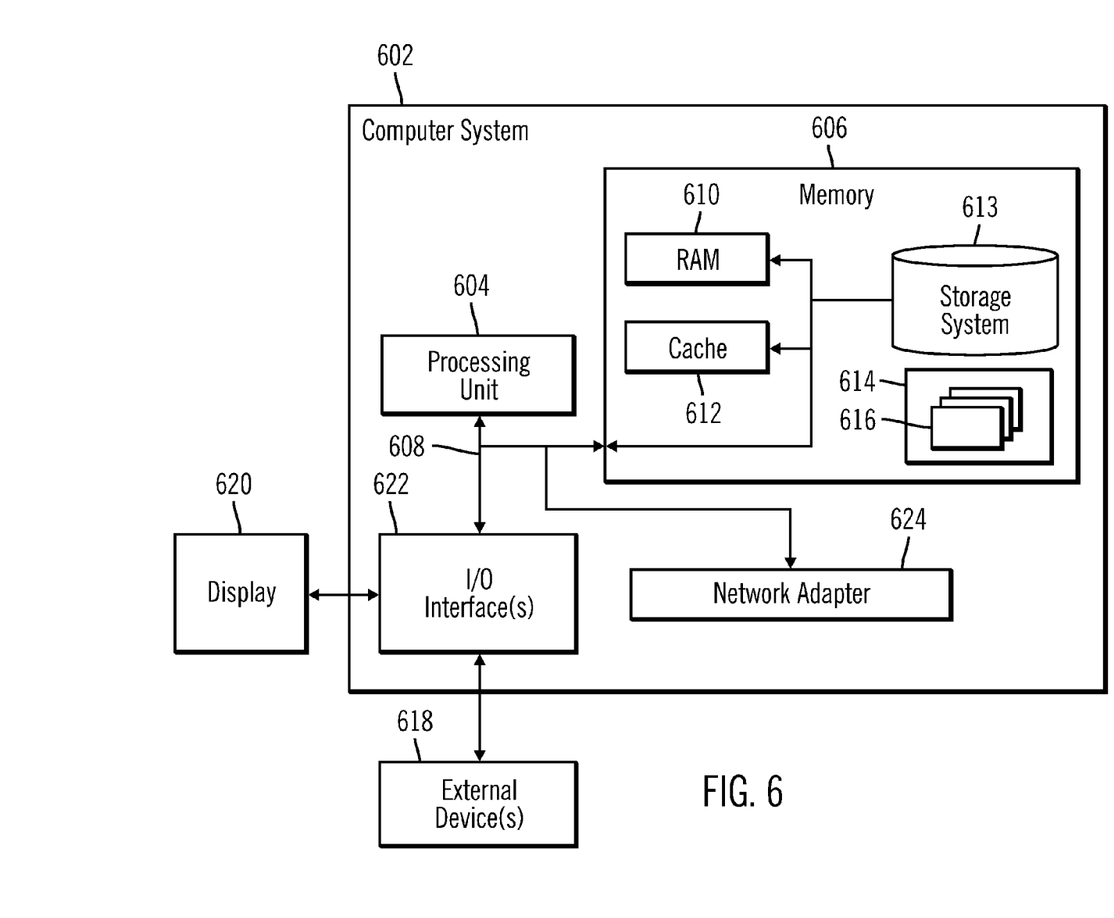
FIG. 6 illustrates a computing environment in which the components of FIG. 1 may be implemented.

The computational components of FIG. 1, including the hosts 100 and storage servers 102a, 102b, 102c may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for copying data in a storage computing environment having a plurality of storage servers, wherein the computer program product comprises a computer readable storage medium having program instructions embodied therewith, the program instructions executable by a processor to cause operations, the operations comprising:

establishing a plurality of source copy relationships, wherein each of the source copy relationships is from a source storage to one of a plurality of source copy storages, wherein data is copied from the source storage to the source copy storages in the source copy relationships to provide a mirror copy of data at the source storage at the source copy storages;

establishing a plurality of target copy relationships, wherein each of the target copy relationships is from a target storage to one of a plurality of target copy storages, wherein data is copied from the target storage to the target copy storages to provide a mirror copy at the target copy storage;

maintaining, for each of the source and target copy relationships, an indicator indicating whether to use a first type of copy operation;

determining from the indicator the source and target copy relationships indicating to use the first type of copy operation;

using the first type of copy operation to copy data from the source storage to the target storage;

using the first type of copy operation to copy data from the source copy storage to the target copy storage for the determined source and target copy relationships having the indicator set to use the first type of copy operation in response to using the first type of copy operation to copy data from the source storage to the target storage; and using a second type of copy operation to copy data from the source storage to the source copy storage and from the target storage to the target copy storage in the source and target relationships having the indicator set to not use the first type of copy operation.

2. The computer program product of claim 1, wherein the using the first type of copy operation for the target copy relationship comprises sending a first type of copy operation command to the storage server including the source and target copy storages in the source and target copy relationships having the indicator set to use the first type of copy operation to cause the first type of copy operation from the source copy storage to the target copy storage.

3. The computer program product of claim 2, wherein the source and target storages are implemented at a first storage server of the storage servers and wherein the source and target copy storages in the source and target copy relationships, respectively, having the indicator set to perform the first type of copy operation are implemented in a second storage server of the storage servers, wherein the first type of copy operation command is sent to the second storage server to perform the first type of copy operation to copy data from the source copy storage to the target copy storage.

4. The computer program product of claim 3, wherein the source and target copy storages in the source and target copy relationships, respectively, having the indicator not set to perform the first type of copy operation are implemented in a third storage server of the storage servers.

5. The computer program product of claim 1, wherein the operations further comprises:

receiving an establish a first type of copy operation from the source storage to the target storage; and determining from the indicators for the source and target copy relationships whether there is ambiguity as to which source storage and target storage copy relationships should be using the first type of copy operation, wherein the using the first type of copy operation to copy data from the source storage to the target storage and from the source copy storage to the target copy storage and using the second type of copy operation are performed in response to determining that there is no ambiguity.

6. The computer program product of claim 5, wherein the determining the ambiguity comprises:

determining whether only one of each of the source and target copy relationships indicates to use the first type of copy operation, wherein there is ambiguity if zero or more than one of the indicators for each of the source and target copy relationships indicates to use the first type of copy operation.

7. The computer program product of claim 5, wherein the the establish the first type of copy operation indicates a preferred or required setting, and wherein the operations further comprise:

failing the establish the first type of copy operation in response to determining there is ambiguity when the establish the first type of copy operation includes the required setting; and using the second type of copy operation for the source and target copy relationships having the indicator indicating to use the first type of copy operation in response to determining there is ambiguity when the establish the first type of copy operation includes the preferred setting.

8. The computer program product of claim 1, wherein the first type of copy operation comprises a point-in-time copy operation and wherein the second type of copy operation comprises establish a duplex pending state and physically copying the data until specified primary and secondary storages are synchronized.

9. The computer program product of claim 8, wherein the source and target copy relationships for which the point-in-time copy operation are performed remain capable for a failover operation from the source copy storage to the source storage and the target copy storage to the target storage, respectively, immediately after the point-in-time copy operation is performed and wherein the source and target storage copy relationships for which the second type of copy operation is performed are only capable for the failover operation in response to reaching a full duplex state after copying over the data from the source storage to the source copy storage and the target storage to the target copy storage, respectively.

10. A system for copying data in a storage computing environment having a plurality of storage servers, comprising:
a processor; and
a computer readable storage medium including program instructions to perform operations, the operations comprising:
providing a plurality of source copy relationships, wherein each of the source copy relationships is from a source storage to one of a plurality of source copy storages, wherein data is copied from the source storage to the source copy storages in the source copy relationships to provide a mirror copy of data at the source storage at the source copy storages;
providing a plurality of target copy relationships, wherein each of the target copy relationships is from a target storage to one of a plurality of target copy storages, wherein data is copied from the target storage to target copy storages to provide a mirror copy at the target copy storages;
maintaining, for each of the source and target copy relationships, an indicator indicating whether to use a first type of copy operation;
determining from the indicator the source and target copy relationships indicating to use the first type of copy operation;
using the first type of copy operation to copy data from the source storage to the target storage;
using the first type of copy operation to copy data from the source copy storage to the target copy storage for the determined source and target copy relationships having the indicator set to use the first type of copy operation in response to using the first type of copy operation to copy data from the source storage to the target storage; and
using a second type of copy operation to copy data from the source storage to the source copy storage and from the target storage to the target copy storage in the source and target relationships having the indicator set to not use the first type of copy operation.

11. The system of claim 10, wherein the first type of copy operation comprises a point-in-time copy and wherein the second type of copy operation comprises establish a duplex pending state and physically copying the data until specified primary and secondary storages are synchronized.

12. The system of claim 11, wherein the using the first type of copy operation for the target copy relationship comprises sending a first type of copy operation command to the storage server including the source and target copy storages in the source and target copy relationships having the indicator set to use the first type of copy operation to cause the first type of copy operation from the source copy storage to the target copy storage.

13. The system of claim 12, wherein the source and target storages are implemented at a first storage server of the storage servers and wherein the source and target copy storages in the source and target copy relationships, respectively, having the indicator set to perform the first type of copy operation are implemented in a second storage server of the storage servers, wherein the first type of copy operation command is sent to the second storage server to perform the first type of copy operation type to copy data from the source copy storage to the target copy storage.

14. The system of claim 11, wherein the operations further comprises:
receiving an establish a first type of copy operation from the source storage to the target storage; and
determining from the indicators for the source and target copy relationships whether there is ambiguity as to which source storage and target storage copy relationships should be using the first type of copy operation, wherein the using the first type of copy operation to copy data from the source storage to the target storage and from the source copy storage to the target copy storage and using the second type of copy operation are performed in response to determining that there is no ambiguity.

15. The system of claim 14, wherein the determining the ambiguity comprises:
determining whether only one of each of the source and target copy relationships indicates to use the first type of copy operation, wherein there is ambiguity if zero or more than one of the indicators for each of the source and target copy relationships indicates to use the first type of copy operation.

16. The system of claim 14, wherein the establish the first type of copy operation indicates a preferred or required setting, and wherein the operations further comprise:
failing the establish the first type of copy operation in response to determining there is ambiguity when the establish the first type of copy operation includes the required setting; and
using the second type of copy operation for the source and target copy relationships having the indicator indicating to use the first type of copy operation in response to determining there is ambiguity when the establish the first type of copy operation includes the preferred setting.

17. A method for copying data in a storage computing environment having a plurality of storage servers, comprising:
establishing a plurality of source copy relationships, wherein each of the source copy relationships is from a source storage to one of a plurality of source copy storages, wherein data is copied from the source storage to the source copy storages in the source copy relationships to provide a mirror copy of data at the source storage at the source copy storages;

establishing a plurality of target copy relationships, wherein each of the target copy relationships is from a target storage to one of a plurality of target copy storages, wherein data is copied from the target storage to the target copy storages to provide a mirror copy at the target copy storages;

maintaining, for each of the source and target copy relationships, an indicator indicating whether to use a first type of copy operation;

determining from the indicator the source and target copy relationships indicating to use the first type of copy operation;

using the first type of copy operation to copy data from the source storage to the target storage;

using the first type of copy operation to copy data from the source copy storage to the target copy storage for the determined source and target copy relationships having the indicator set to use the first type of copy operation in response to using the first type of copy operation to copy data from the source storage to the target storage; and using a second type of copy operation to copy data from the source storage to the source copy storage and from the target storage to the target copy storage in the source and target relationships having the indicator set to not use the first type of copy operation.

18. The method of claim 17, wherein the using the first type of copy operation for the target copy relationship comprises sending a first type of copy operation command to the storage server including the source and target copy storages in the source and target copy relationships having the indicator set to use the first type of copy operation to cause the first type of copy operation from the source copy storage to the target copy storage.

19. The method of claim 18, wherein the source and target storages are implemented at a first storage server of the storage servers and wherein the source and target copy storages in the source and target copy relationships, respectively, having the indicator set to perform the first type of copy operation are implemented in a second storage server of the storage servers, wherein the first type of copy operation command is sent to the second storage server to perform the first type of copy operation type to copy data from the source copy storage to the target copy storage.

20. The method of claim 17, further comprising:
receiving an establish a first type of copy operation from the source storage to the target storage; and
determining from the indicators for the source and target copy relationships whether there is ambiguity as to which source storage and target storage copy relationships should be using the first type of copy operation, wherein the using the first type of copy operation to copy data from the source storage to the target storage and from the source copy storage to the target copy storage and using the second type of copy operation are performed in response to determining that there is no ambiguity.

21. The method of claim 20, wherein the determining the ambiguity comprises:
determining whether only one of each of the source and target copy relationships indicates to use the first type of copy operation, wherein there is ambiguity if zero or more than one of the indicators for each of the source and target copy relationships indicates to use the first type of copy operation.

22. The method of claim 20, wherein the establish the first type of copy operation indicates a preferred or required setting, further comprising:
failing the establish the first type of copy operation in response to determining there is ambiguity when the establish the first type of copy operation includes the required setting; and
using the second type of copy operation for the source and target copy relationships having the indicator indicating to use the first type of copy operation in response to determining there is ambiguity when the establish the first type of copy operation includes the preferred setting.

23. The method of claim 17, wherein the first type of copy operation comprises a point-in-time copy and wherein the second type of copy operation comprises establish a duplex pending state and physically copying the data until specified primary and secondary storages are synchronized.

* * * * *